Jan. 27, 1959
M. K. ERIKSEN
2,870,482
BEAD ALIGNING MEANS
Filed July 13, 1955
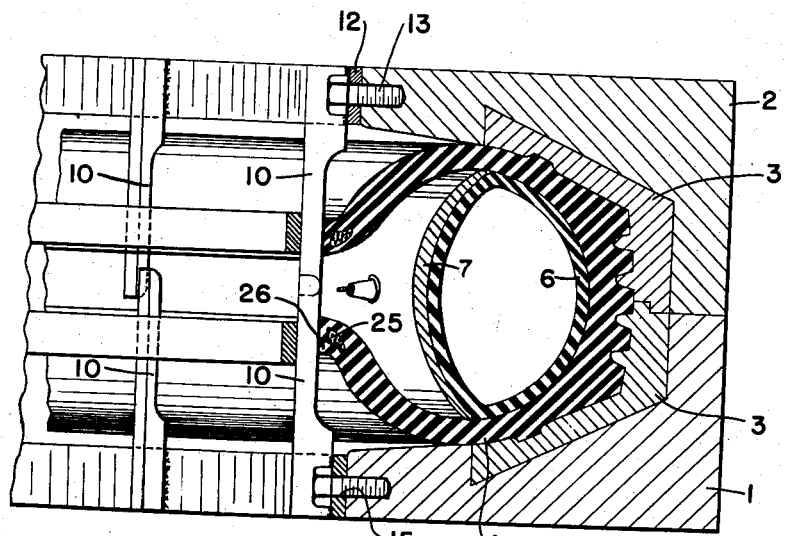
FIG. 1
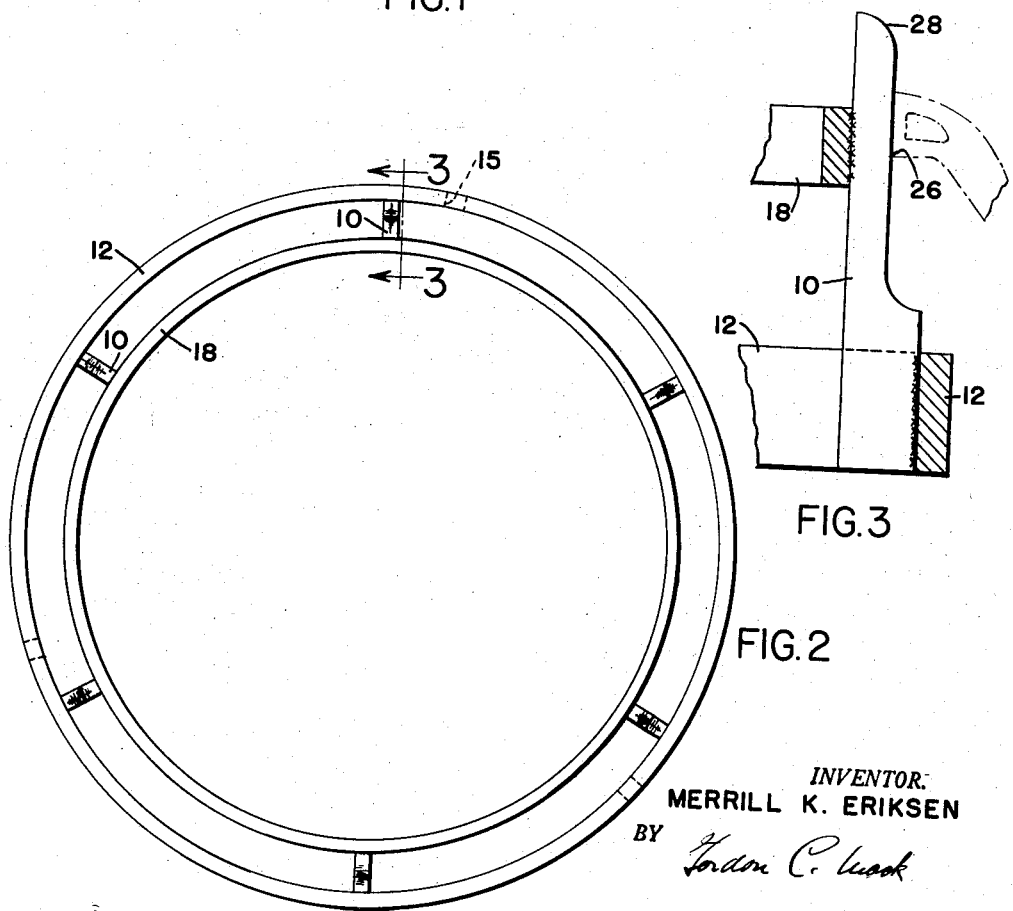
FIG. 2
FIG. 3
INVENTOR.
MERRILL K. ERIKSEN
BY
ATTORNEY

United States Patent Office 2,870,482
Patented Jan. 27, 1959

2,870,482
BEAD ALIGNING MEANS

Merrill K. Eriksen, Bay Village, Ohio, assignor to The James C. Heintz Company, Cleveland, Ohio, a corporation of Ohio Application July 13, 1955, Serial No. 521,682

2 Claims. (Cl. 18—18)

This invention relates to bead-aligning means for a retreading mold to be used with an inside curing rim. It includes the bead-aligner assembly and a retreading mold equipped with the assembly.

One difficulty with the use of inside curing rims has been the inability to easily center the tire in a mold in which they are employed. If the tire is not exactly centered, the new tread is not symmetrical and wobbles when the wheel on which the tire is placed is put in motion.

The aligning means of this invention includes legs which are fastened in staggered relation to the inner circumferences on its upper and lower platens. These legs are so shaped that when the platens are brought together, the beads of the tire being retreaded ride up over the ends of the legs and over the outer surfaces thereof adjacent these ends. In this manner the tire is shifted within the mold to bring the beads into alignment. This centers the tire within the mold, and a new tread applied to a tire when in this position in the mold will be located symmetrically on the tire. These tire aligning legs are advantageously fastened to a mounting ring which is preferably removably bolted to the inner circumference of a platen, a like ring being bolted to the inner circumference of the other platen. The rings need not be full 360-degree rings, but may be segments. Thus, if there are six legs, three may be attached to each of two different segments and these segments may be independently attached to the inner circumference of a platen.

In order to steady the legs, a support ring or segment thereof may be fastened to the inner surfaces of the legs.

This will be more clearly explained in connection with the accompanying drawings in which—

Fig. 1 is a section through a portion of the mold showing the inside curing rim and several of the legs, etc.;

Fig. 2 is a plan view of the aligner assembly; and

Fig. 3 is a detail showing the position of the bead of a tire in contact with one of the legs when the mold is closed.

The mold is of any usual design which includes two platens adapted to be moved toward and away from one another. The drawing shows a lower platen 1 and an upper platen 2. Matrices 3 are located on the platens for the retreading of a tire of the size of the tire 4. Each platen is designed to contact the new tread with which the tire is being retreaded, and no more than a part of the upper portion of each side wall.

Located inwardly of the tire are the curing bag 6 and the inside curing rim 7. The inside curing rim is of any usual design such as a sectional rim which can be easily inserted and removed from the tire in sections. The bag fits against the inner surface of the tread of the tire and cures the new rubber tread stock against the matrix. The lower portion of the sidewalls and bead are free and are not heated internally or externally during such a retreading operation.

The aligning legs 10 may be made a permanent part of the mold, but are preferably removably attached to the upper and lower matrices so that legs to be used with tires of different inside diameters may be attached to the same mold. Thus, in the drawings, the legs are shown as welded to a mounting ring 12 which in turn is bolted to the platens by bolts 13. The drawings show a mounting ring 12 which holds six legs and is a complete circle. It is provided with bolt holes 15.

A support ring 18 is welded to the inner surface of the legs to steady them and to keep them properly spaced. This assembly comprising the mounting ring 12, the support ring 18, and the centering legs 10 to which each of the rings is welded, makes a rigid unit which is readily bolted to the inner circumference of the upper or lower platen.

The tire is inserted in the mold when the platens are spread apart. If the tire is not accurately centered in the mold as the platens are closed, the legs contact one or the other of the beads 25 at the heel 26. The ends 28 of the legs are rounded outwardly, so that as they come in pressure contact with the heel 26 of the bead of a tire, the bead rides up over this surface 28 of the leg, and the position of the tire is thus shifted within the mold until both beads 25 are in contact with the surfaces of the aligning legs attached to the respective platens at substantially the same short distance away from the end of each. The outer surfaces of the legs may be lubricated so that the beads will slide over them readily. It will be noted from Fig. 1 that the ends of the legs overlap somewhat in the closed mold, the legs in the respective platens being staggered so as not to touch one another.

After completion of the retreading operation, as the mold is opened, the legs do not in any way interfere with the removal of the tire from the mold. The outer surfaces of the legs are smooth and the beads slide over them quite readily.

The same aligning assemblies may be used in any one mold for tires of any one inside diameter. For tires of different inside diameters different aligning assemblies will be required. If the legs on these different aligning assemblies are all of the same size and shape, mounting rings 12 of different thicknesses may be used to space the legs different distances from the axis of the mold. Alternatively, the legs may be shaped differently and attached to mounting rings of the same or different thicknesses.

The aligning assemblies for any platen may be made annular and in one piece. Alternatively, and particularly for molds designed for the retreading of larger tires, it may be desirable to form the aligning assembly for each platen in two or more segments, each of which includes a small plurality of legs.

I claim:

1. A retreading mold formed with generally annular upper and lower platens each designed to contact the new tread for a tire and no more than a part of the upper portion of a side wall, whereby the mold is adapted for use with an inside curing rim, the mold having a plurality of legs attached at one end to each platen adjacent its inner circumference and directed toward the opposite platen, the legs on the respective platens overlapping one another when the platens are closed and being staggered then so that they do not touch one another, the other ends of the legs being smoothly tapered on their outer surfaces so that the heels of the beads of a tire in pressure contact with the ends of legs attached to the respective platens will slide over the tapered ends thereof onto the surfaces of the legs adjacent the tapered ends whereby the tire will be aligned in the mold, said surfaces of the legs being substantially perpendicular to the planes of the respective platens.

2. The retreading mold of claim 1 in which the smoothly tapered portion of each leg is rounded outwardly.

References Cited in the file of this patent

UNITED STATES PATENTS

| | | |
|---|---|---|
| 2,155,906 | Rihn et al. | Apr. 25, 1939 |
| 2,242,795 | Soderquist | May 20, 1941 |
| 2,291,506 | Shook et al. | July 28, 1942 |
| 2,319,447 | Drennan | May 18, 1943 |
| 2,516,715 | Moore | July 25, 1950 |
| 2,659,104 | Glynn | Nov. 17, 1953 |
| 2,728,945 | Clapp | Jan. 3, 1956 |